US007930093B2

(12) United States Patent
Bauer et al.

(10) Patent No.: US 7,930,093 B2
(45) Date of Patent: Apr. 19, 2011

(54) METHOD AND SYSTEM FOR FILTERING A DISTURBED CYLINDER PRESSURE SIGNAL FROM A CYLINDER IN AN INTERNAL COMBUSTION ENGINE

(75) Inventors: Erwin Bauer, Lappersdorf (DE); Dietmar Ellmer, Regensburg (DE); Jan Haag, Nittenai (DE); Benjamin L'Hénoret, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 188 days.

(21) Appl. No.: 12/351,952

(22) Filed: Jan. 12, 2009

(65) Prior Publication Data

US 2009/0182491 A1 Jul. 16, 2009

(30) Foreign Application Priority Data

Jan. 15, 2008 (DE) ........................ 10 2008 004 442

(51) Int. Cl.
*G06F 19/00* (2006.01)

(52) U.S. Cl. .............. 701/114; 123/406.13; 123/406.42; 73/35.03

(58) Field of Classification Search .................. 701/103, 701/110, 111, 114; 123/435, 406.13, 406.27, 123/406.41, 406.42, 436, 179.4; 73/35.03, 73/35.12
See application file for complete search history.

(56) References Cited

U.S. PATENT DOCUMENTS

| | | | | |
|---|---|---|---|---|
| 4,491,010 | A * | 1/1985 | Brandt et al. | 73/35.05 |
| 4,753,200 | A * | 6/1988 | Kawamura et al. | 123/188.14 |
| 4,788,854 | A * | 12/1988 | Javaherian | 73/114.72 |
| 5,495,415 | A * | 2/1996 | Ribbens et al. | 701/111 |
| 6,276,319 | B2 | 8/2001 | Walter et al. | 123/90.15 |
| 7,212,912 | B2 | 5/2007 | Okubo et al. | 701/114 |
| 7,376,506 | B2 * | 5/2008 | Schueler | 701/114 |
| 2008/0148826 | A1 * | 6/2008 | Raichle et al. | 73/114.27 |
| 2009/0182484 | A1 * | 7/2009 | Loeffler et al. | 701/103 |
| 2009/0182485 | A1 * | 7/2009 | Loeffler et al. | 701/103 |
| 2009/0287389 | A1 * | 11/2009 | Bauer et al. | 701/102 |

FOREIGN PATENT DOCUMENTS

| | | | |
|---|---|---|---|
| DE | 197 41 820 | A1 | 3/1999 |
| DE | 101 04 753 | A1 | 8/2002 |
| DE | 10 2004 054 711 | A1 | 5/2006 |

OTHER PUBLICATIONS

Fischer et al., Klopferkennung im Ottomotor, Neue Tools and Methoden in der Serienentwicklung, Entwicklung, Verbrennung, pp. 186-194, Mar. 2003.

* cited by examiner

*Primary Examiner* — John T Kwon
(74) *Attorney, Agent, or Firm* — King & Spalding L.L.P.

(57) ABSTRACT

For at least one disturbance variable of the cylinder pressure signal, which disturbance variable occurs only during specific limited time spans as the pressure profile of an operating cycle, a filter tuned to the type of disturbance variable is fixed and is assigned to the corresponding disturbance variable time window or windows (8, 9, 10) in the operating cycle. The cylinder pressure signal (2) is then filtered as a function of the crankshaft angle, in that, according to the crankshaft position, a time-tuned and type-tuned filter is applied to a current disturbance variable.

19 Claims, 3 Drawing Sheets

METHOD AND SYSTEM FOR FILTERING A DISTURBED CYLINDER PRESSURE SIGNAL FROM A CYLINDER IN AN INTERNAL COMBUSTION ENGINE

CROSS-REFERENCE TO RELATED APPLICATIONS

This application claims priority to German Patent Application No. 10 2008 004 442.3 filed Jan. 15, 2008, the contents of which is incorporated herein by reference in its entirety.

TECHNICAL FIELD

The present invention relates to a method for filtering a disturbed cylinder pressure signal from a cylinder in an internal combustion engine. The invention relates, moreover, to a system for carrying out a method of this type.

BACKGROUND

A method of this type is already known from DE 10 2004 054 711 A1. The known method for operating an internal combustion engine proposes, to increase the accuracy of determining a preferred location of a (crank)shaft of the internal combustion engine, in addition to other measures, filtering a signal characteristic of the combustion process, for example a cylinder pressure signal, in particular by means of a low-pass filter, in order to remove higher-frequency disturbances from the signal.

Whereas, in the past, cylinder pressure sensors have been used virtually solely for research and development purposes in engine development, marked tendencies toward a series use of this component have recently been shown. This applies both to gasoline and to diesel engines. The objective, in addition to dispensing with conventional sensors, such as, for example, the knock sensor, is to have an improved check of the combustion process in order to increase engine efficiency and to adhere to the increasingly stringent statutory emission limit values.

Special mention may be made, in this context, of what is known as the CAI method (controlled auto ignition). This is a homogeneous lean compression ignition method which, because of its sensitivity, is controlled reliably only by the use of cylinder pressure sensors. The cylinder pressure signal in this case serves for determining characteristic combustion process variables, such as the indicated mean pressure and the combustion center of gravity.

The recent processes for controlling an internal combustion engine place high requirements on the exactness of the cylinder pressure data. Experience shows, however, that untreated cylinder pressure signals which are picked up on internal combustion engines are exposed to numerous disturbances even in the case of optimally functioning cylinder pressure sensors. In this case, what is first to be considered is mechanical disturbing influences which originate particularly from the solid-borne sound oscillations of the gas exchange valves which impinge harshly when they close. In addition, there are various types of rapid thermal and electromagnetic disturbing influences which in each case arise at specific time points in the operating cycle of the internal combustion engine and in each case exert a characteristic disturbing influence on the cylinder pressure signal. The problem is, above all, the diversity of the disturbing influences and their high time variability dependent on the rotational speed.

SUMMARY

According to various embodiments, an improved method and a system of the type initially mentioned can be specified which allow an effective utilization of the cylinder pressure signal which is susceptible to disturbance.

According to an embodiment, a method for filtering a disturbed cylinder pressure signal from a cylinder in an internal combustion engine, may comprise the steps of: for at least one disturbance variable occurring only during specific limited time spans of the pressure profile of an operating cycle, a filter tuned to the type of disturbance variable is fixed and is assigned to the corresponding disturbance variable time window or windows in the operating cycle, and the cylinder pressure signal is filtered as a function of the crankshaft angle, wherein, according to the crankshaft position, a time-tuned and type-tuned filter is applied to a current disturbance variable.

According to a further embodiment, the filter type to be assigned to a disturbance variable and the corresponding disturbance variable time windows can be determined by tests on the engine test bench or on the test vehicle and are fixed for series operation. According to a further embodiment, at least one of the filter parameters can be determined and is fixed. According to a further embodiment, the filter parameters may be high-pass, low-pass, limit frequency and quality. According to a further embodiment, the cylinder pressure can be detected by a cylinder pressure sensor belonging to the cylinder, and the filter parameters can be stored in a non-volatile manner in an electronic evaluation unit assigned to the cylinder pressure sensor. According to a further embodiment, a variable filter can be provided and may be activated in such a way that at least two different types of filters for filtering the associated different disturbance variables are applied in succession. According to a further embodiment, the information on the current crankshaft position dependent on rotational speed can be determined from a cylinder pressure profile analysis, significant points of the cylinder pressure profile being detected during an operating cycle of the internal combustion engine, and the engine rotational speed and current crankshaft position being determined from these points. According to a further embodiment, the engine rotational speed can be determined from the time sequence of two combustion pressure maxima detected in the cylinder pressure profile. According to a further embodiment, while the internal combustion engine is in operation, a camshaft phase adjustment may take place, by means of which the position of the disturbance variable windows is displaced in relation to the crankshaft position, and filtration dependent on the crankshaft angle may take place, with the current camshaft phase adjustment being taken into account. According to a further embodiment, the camshaft phase adjustment may be determined from the pressure drop during the opening of the outlet valves or from the pressure rise during the closing of the inlet valves. According to a further embodiment, a low-pass filter with a limit frequency of about 5 kHz may be selected for filtering the disturbance variable which is caused by the closing of the gas exchange valves of the internal combustion engine. According to a further embodiment, a low-pass filter with a limit frequency of about 5 kHz may be selected for filtering the disturbance variable which is caused by the closing of the gas exchange valves of the cylinder which is specific in terms of the cylinder pressure.

According to yet another embodiment, a system for filtering a disturbed cylinder pressure signal from a cylinder in an internal combustion engine, may comprise an electronic evaluation unit, which, for at least one disturbance variable of the cylinder pressure signal, which disturbance variable occurs only during specific limited time spans of the pressure profile of an operating cycle, comprises a filter tuned to the type of disturbance variable, wherein the electronic evaluation unit further comprises a non-volatile memory in which the disturbance variable time window or windows, associated with the disturbance variable, in an operating cycle are stored, and control means in order, according to the current crankshaft position, to apply to a current disturbance variable a filter time-tuned with the aid of the associated disturbance variable window and type-tuned.

According to a further embodiment, the evaluation unit can be formed by an autonomously operating apparatus independent of the engine control. According to a further embodiment, the evaluation unit and a cylinder pressure sensor for detecting the untreated cylinder pressure signal may form a spatially integrated component. According to a further embodiment, the alternating activation, dependent on the crankshaft angle, of the respective disturbance variable-selective filters may be implemented with the aid of a universal filter circuit.

BRIEF DESCRIPTION OF THE DRAWINGS

The preferred embodiments of the present invention are explained in more detail with reference to the accompanying drawing in which.

DETAILED DESCRIPTION

Figure 1:
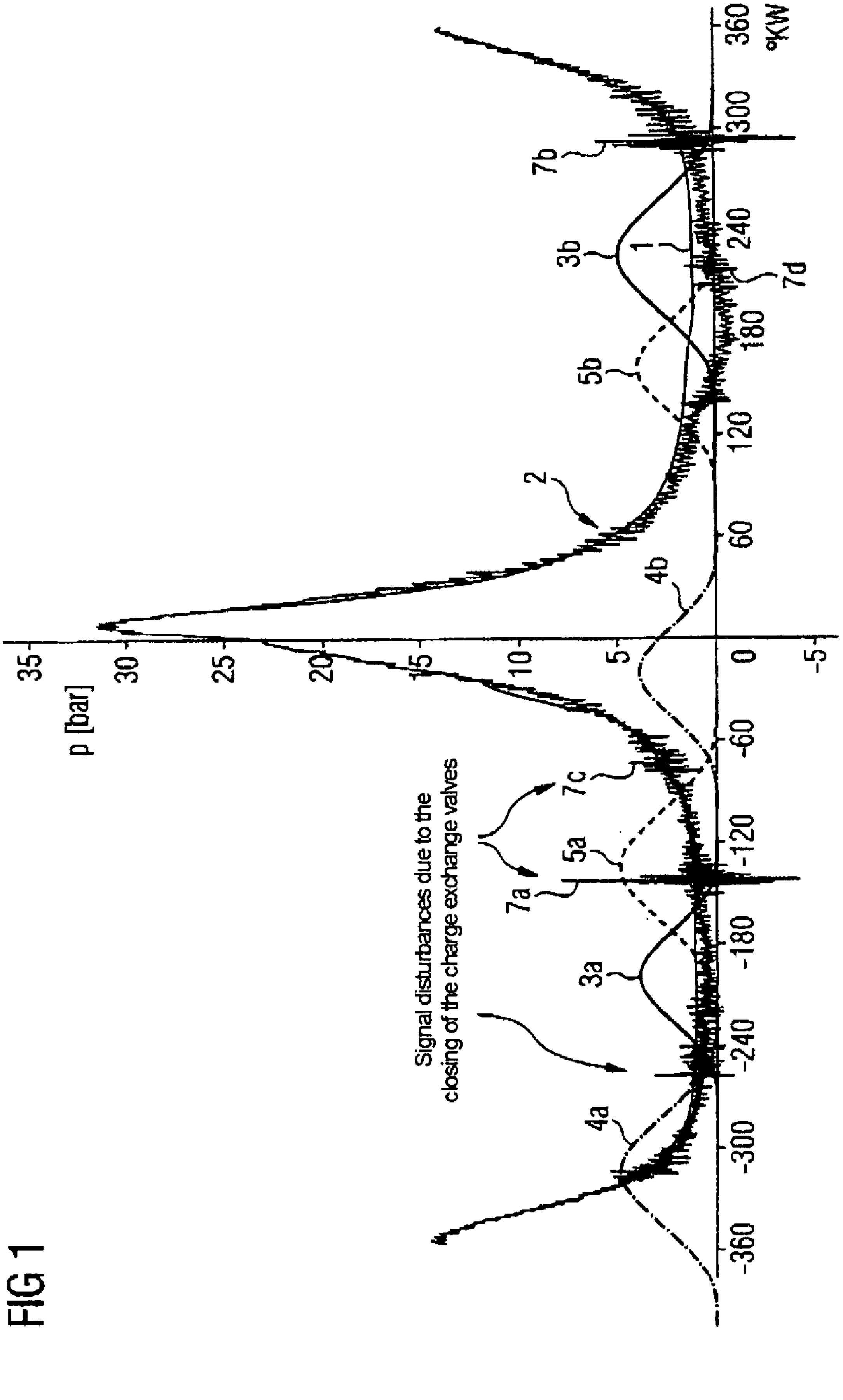
FIG. 1 shows the profile of the amplitude of an undisturbed cylinder pressure signal and of a cylinder pressure signal disturbed by mechanical disturbing influences, against the crankshaft angle.

As regards the method for filtering the cylinder pressure signal, the various embodiments build on the generic prior art in that they comprise the following steps: the fixing, for at least one disturbance variable occurring only during specific limited time spans of the pressure profile of an operating cycle, of a filter tuned to the type of disturbance variable, assignment of this filter to the corresponding disturbance variable time window or windows in the operating cycle, and the filtration, as a function of the crankshaft angle, of the disturbed cylinder pressure signal, in that, according to the crankshaft position, a time-tuned and type-tuned filter is applied to a current disturbance variable.

The filtration of electrical sensor signals is known per se. Essentially, in this case, a distinction is made between active and passive filters. They serve for varying the amplitude of electrical signals as a function of the frequency. Filters in the classic sense are, for example, high-pass, low-pass or band-pass filters. The various embodiments allow the filtration and consequently, for the first time, the effective utilizability of a cylinder pressure signal which is disturbed by different types of disturbance variables which occur in a time-characteristic sequence during the operating cycle.

According to an embodiment, the filter type to be assigned to a disturbance variable and the corresponding disturbance variable time windows are determined by tests on the engine test bench or on the test vehicle and are fixed for series operation. To define the optimized filter type, according to a development, at least one of the filter parameters, namely high-pass, low-pass, limit frequency and quality, is determined or fixed. In this context, there is preferably provision, furthermore, for the cylinder pressure to be detected by a cylinder pressure sensor belonging to the cylinder, and for the predetermined filter parameters to be stored in a non-volatile manner in an electronic evaluation unit assigned to the cylinder pressure sensor.

An essential advantage according to a further embodiment is that a variable filter is provided and is activated in such a way that at least two different types of filters for filtering the associated different disturbance variables are applied in succession.

Basically, the filtration according to the various embodiments which is selective in terms of crankshaft angle can take place on the basis of information on the current crankshaft position which is made available independently of the cylinder pressure signal, that is to say, for example, by the engine control apparatus. According to a further embodiment of the method, which may be considered to be particularly advantageous, however, the information on the current crankshaft position dependent on rotational speed is determined, independently of the engine control, from a cylinder pressure profile analysis, significant points of the cylinder pressure profile being detected during an operating cycle of the internal combustion engine, and the engine rotational speed and current crankshaft position being determined from these points. There is therefore no need for any data exchange, itself susceptible to disturbance, with the engine control. In this case, the engine rotational speed can be determined in an advantageously simple way from the time sequence of two combustion pressure maxima detected in the cylinder pressure profile.

If a camshaft phase adjustment takes place while the internal combustion engine is in operation, the position of the disturbance variable windows is displaced in relation to the crankshaft position. According to a further embodiment, in this case, filtration dependent on the crankshaft angle takes place, with the current camshaft phase adjustment being taken into account. In this case, in particular, it is preferable that the camshaft phase adjustment to be taken into account is determined from the pressure drop during the opening of the outlet valves or from the pressure rise during the closing of the inlet valves.

According to a further preferred embodiment, a low-pass filter with a limit frequency of about 5 kHz is selected for filtering that disturbance variable which is caused by the closing of the gas exchange valves of the internal combustion engine, in particular of the cylinder which is specific in terms of the cylinder pressure.

The system according to various embodiments for filtering a disturbed cylinder pressure signal from a cylinder in an internal combustion engine has an electronic evaluation unit which, for at least one disturbance variable of the cylinder pressure signal, which disturbance variable occurs only during specific limited time spans of the pressure profile of an operating cycle, comprises a filter tuned to the type of disturbance variable. The evaluation unit comprises, furthermore, a non-volatile memory in which the disturbance variable time window or windows, associated with the disturbance variable, in an operating cycle are stored. Moreover, the evaluation unit comprises control means in order, according to the current crankshaft position, to apply to a current disturbance variable a filter time-tuned with the aid of the associated disturbance variable window and type-tuned.

According to various embodiments, this affords the possibility of evaluation electronics independent from the engine control, particularly of an evaluation unit which is formed by an autonomously operating apparatus independent of the engine control (ECU). According to a further embodiment, the evaluation unit and a cylinder pressure sensor for detecting the untreated cylinder pressure signal form a spatially integrated component. This gives rise to an "intelligent" sensor, what is known as a "smart component". Advantageously, the alternating activation, dependent on the crankshaft angle, of the respective disturbance variable-selective filters of the system according to various embodiments is implemented with the aid of a universal filter circuit.

To explain the method according to various embodiments, the profile of a signal 2, having signal disturbances, of the cylinder pressure p against the crankshaft angle KW is illustrated in FIG. 1. For comparison, the curve of an undisturbed reference signal 1 is also illustrated. Between −360° KW and +360° KW, the curves 1 and 2 reflect essentially the known operating cycle of a four-stroke internal combustion engine, commencing with the intake stroke, an increase in the cylinder pressure p in the following compression stroke, followed by the reaching of the combustion pressure maximum and the start of the decrease in pressure in the subsequent combustion stroke, and also the further decrease and rise again of the cylinder pressure in the following expulsion and intake strokes. What is illustrated by way of example is an autoignition CAI combustion with intermediate compression in the charge exchange at top dead center (at approximately −360° KW or +360° KW), which requires no additional ignition, so that, in this simplified example, the cylinder pressure signal 2 is not subjected to electromagnetic disturbing influences, but only to mechanical disturbing influences. FIG. 1 illustrates the cylinder pressure signal 2 from the third cylinder of a four-cylinder in-line engine (stroke sequence: first, third, fourth, second cylinder).

If the disturbed cylinder pressure signal 2 is considered in (time) relation to the valve stroke curves 4 (fourth cylinder), 3 (third cylinder) and 5 (second cylinder), it quickly becomes clear that the disturbance peaks 7*a* to 7*d* in the pressure signal 2 are solid-borne sound oscillations which are generated due to the (harsh) impingement of the gas exchange valves on the cylinder head during the closing action. The disturbance peaks 7*a* and 7*b* are triggered at the end of the valve stroke curves 3*a* and 3*b* respectively, that is to say during the closing of the inlet and outlet valve belonging to the specific third cylinder. What can also be seen are the closing time points of the inlet and outlet valves of the adjacent cylinders, these causing a comparatively lower disturbance amplitude 7*c* and 7*d* due to the greater distance from the pressure pick-up and to the higher damping associated with this. The noise in the overall pressure profile 2 is due mainly to the engine vibrations (dependent on rotational speed) which are detected by the pressure pick-up. The noise extends basically over the entire operating cycle, even though the region of the pressure maximum remains relatively unaffected. As can be seen, the disturbance pulses 7*a* to 7*d* are distinguished by a position in the cylinder pressure profile which recurs periodically at a constant rotational speed and is dependent on the crankshaft angle and by a characteristic frequency. According to various embodiments, when the respective crankshaft position is reached during current operation or the respective disturbance variable time window is immediately imminent, a filter tuned to the type of disturbance pulses 7*a* to 7*d*, that is to say to the type of disturbance variable, is provided and is applied to the signal 2 having the disturbance pulses, so that these are filtered out from the untreated cylinder pressure signal 2. The filter corresponding as optimally as possible to the respective disturbance variable is therefore not active constantly, but only in the relevant disturbance variable windows.

For example, to eliminate the solid-borne sound disturbance peaks 7*a* and 7*b*, it can be fixed that the associated filter is applied in crankshaft angle ranges (disturbance variable windows) which are centered around −140° KW or around +290° KW.

In addition to the mechanical disturbance influences mentioned, above all, electromagnetic disturbance influences on the cylinder pressure signal must also be taken into account. The ignition system may be mentioned in this context as the main disturbance source. On account of the direct proximity of the ignition coil and spark plug to the cylinder pressure sensor, an influence of the high-voltage ignition pulse on the sensor signal is almost impossible to avoid. In many cases, however, this influence can be markedly attenuated by means of corresponding shielding measures.

Figure 2:
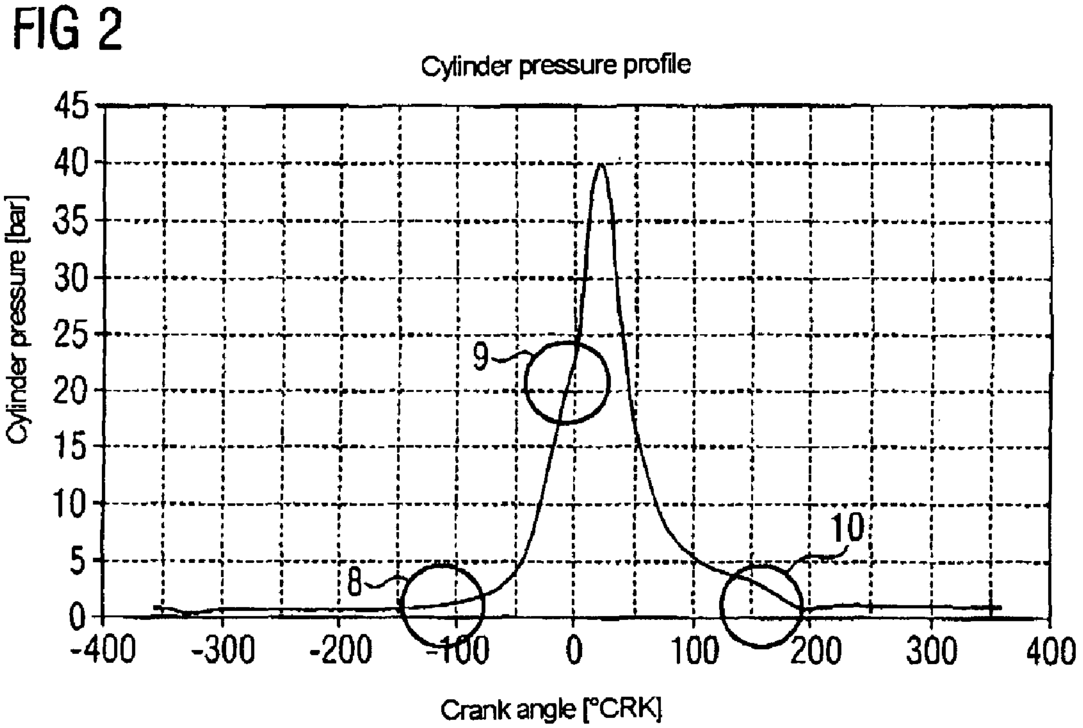
FIG. 2 shows the position of various disturbance variable windows in a graph of a cylinder pressure profile to be filtered according to various embodiments.

FIG. 2 shows a cylinder pressure profile curve 2 from which the relative position of three different disturbance variables or the associated disturbance variable windows in the operating cycle can be gathered. The disturbance variable window 8 (from which the position, in the same way as the position of the disturbance variable window 10, is displaced with respect to the position of the corresponding large disturbance pulses 7*a* and 7*b* according to FIG. 1) relates to the closing of the inlet valve of the cylinder belonging to the cylinder pressure profile 2 illustrated. The optimized filter type (low-pass filter) belonging to the disturbance variable window 8 therefore experiences, in the example illustrated, an activation at approximately −150° KW and a deactivation at approximately −80° KW. This is followed, in the time duration predetermined by the disturbance variable window 9, by the application of another filter type which is optimized for filtering the disturbing influences emanating from the ignition. In this case, a low-pass filter is also used, but with a markedly higher limit frequency than in the disturbance variable window 9. Lastly, in the example shown in FIG. 2, during the disturbance variable window 10 a filter is applied which is suitable for eliminating the disturbance signals triggered during the closing of the outlet valve.

Thermal influences on the cylinder pressure signal are also generated as a result of the basic type of operation of an internal combustion engine and of the accompanying wide temperature range and the rapid temperature changes in the combustion space and should be eliminated for the effective utilization of the pressure signal. Basically, a medium time drift, that is to say a disturbance variable dependent on the mean operating (combustion space) temperature of the internal combustion engine, and a short time drift, that is to say a disturbance variable caused by the rapid temperature rise during the start of combustion (thermal shock), have to be taken into account. Depending on the sensor principle, the sensor design and the outlay in terms of temperature compensation, a more or less pronounced disturbing influence on the sensor signal is obtained.

What is characteristic of the abovementioned disturbing influences is that they occur at a specific time point (for example, ignition time point) or during a specific (limited) time span. The time point or time span of the disturbing influences is dependent primarily on the engine rotational speed, on the crankshaft position and on the position of the camshaft phase adjuster. The data regarding the rotational speed, crankshaft position, ignition time point and phase position of the camshaft adjusters are, of course, known to the engine control, that is to say are available with high accuracy when the evaluation required for filtering the pressure signal takes place in the engine control. However, as shown below, the engine rotational speed, the crankshaft position and the position of the camshaft phase adjusters can also be derived from the cylinder pressure signal. Such an "autonomous" determination of these variables from the profile of the cylinder pressure signal itself affords the precondition for an independent system ("stand-alone module"), so that there is no direct dependence on the engine control and there does not need to be any information and data exchange from the ECU in the direction of the cylinder pressure sensor.

When the cylinder pressure profile of combustion in a gasoline engine is analyzed against the crankshaft angle, a plurality of significant corner points can be recognized which can be utilized for the further determination of the data required for filtration which is selective in terms of the crankshaft angle. These corner points are, in particular, a) the maximum cylinder pressure during combustion
b) the pressure rise after the closing of the inlet valves in the compression stroke, and
c) the pressure drop after the opening of the outlet valves in the expansion stroke.

From these points and their relation to the crankshaft position or to the crankshaft angle, on the one hand, first the engine rotational speed can be determined, to be precise from the time sequence of two combustion pressure maxima. Furthermore, in a way known per se, the current crankshaft position can be determined from the rotational speed, that is to say the knowledge of how long a revolution lasts and the knowledge of an absolute position, for example, again, of the pressure maximum position to be gathered from the cylinder pressure profile.

On the other hand, the position of the pressure rise after the closing of the inlet valves is an indicator of the position of the inlet camshaft with respect to the crankshaft position. This is important in systems with inlet-side camshaft phase adjustment, in which, during operation, a displacement of the position of the signal disturbances in relation to their crankshaft position occurs without adjustment. Furthermore, the position of the pressure drop after the opening of the outlet valves is an indicator of the position of the outlet camshaft with respect to the crankshaft position. This is important in systems with outlet-side camshaft phase adjustment.

Figure 3:
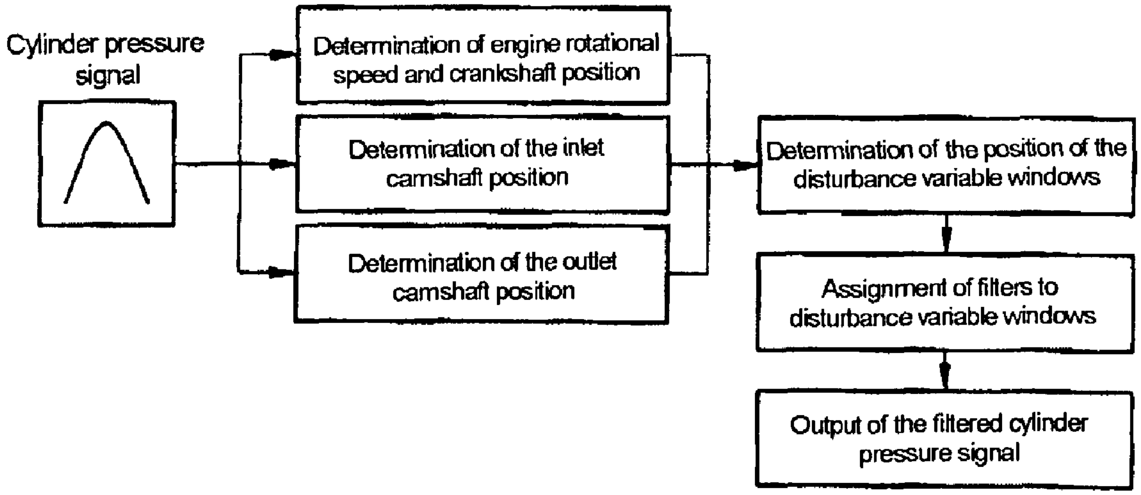
FIG. 3 shows a roughly diagrammatic flowchart of an exemplary embodiment of the method.

As a consequence of the principle adopted, by means of this embodiment of the method according to various embodiments, the determination of the engine rotational speed and of the camshaft position can be achieved only with restricted accuracy. This is sufficient, however, for the further flow in terms of functionality. The relations mentioned are illustrated once again in FIG. 3 in the form of diagrammatic method steps. When the new position of the disturbance variable windows is determined and is assigned to the corresponding disturbance variables or filters, the application of the optimally time-tuned and type-tuned filters takes place again.

In summary, in the method according to various embodiments, the cylinder pressure signal is filtered as a function of the crankshaft angle according to the individual disturbance variables and their occurrence in time (disturbance windows). The selection of the filter depends on the type of disturbance variable. Whereas disturbances caused by the ignition system are of very high frequency, disturbances due to solid-borne sound shift within the range of about 5-15 kHz. The latter depends essentially on the engine block design and cylinder head design and on the material used (grey cast iron, aluminum). The level of the combustion pressure maximum or, alternatively, the size of the area spanned by the pressure signal against the crank angle per cycle (that is to say, the integral of the cylinder pressure p against the cylinder volume dV) is a measure of the converted energy quantity. From this, a conclusion can be drawn as to the maximum combustion space temperature which, in turn, influences the thermal shock behavior of the sensor. The sensor signal can correspondingly be corrected additionally by means of an offset in the range of high temperatures.

The analysis of the disturbance variables and the determination of the optimal filters and filter parameters (high-pass, low-pass, limit frequency, quality, etc.) advantageously take place on the engine test bench or on the vehicle. Basically, filtration may take place in the engine control, but, as mentioned, it is appropriate to implement the untreated-signal treatment and processing directly on the cylinder pressure sensor, since the sensor signal then does not have to be routed via (long) lines through the entire engine space, thus entailing the risk that further disturbances are picked up. Instead, signal treatment advantageously takes place directly in the sensor, and a robust disturbance-safe signal can be sent to the engine control. Since virtually an intelligent sensor is obtained, a "smart component", as it is known, is also referred to.

Figure 4:
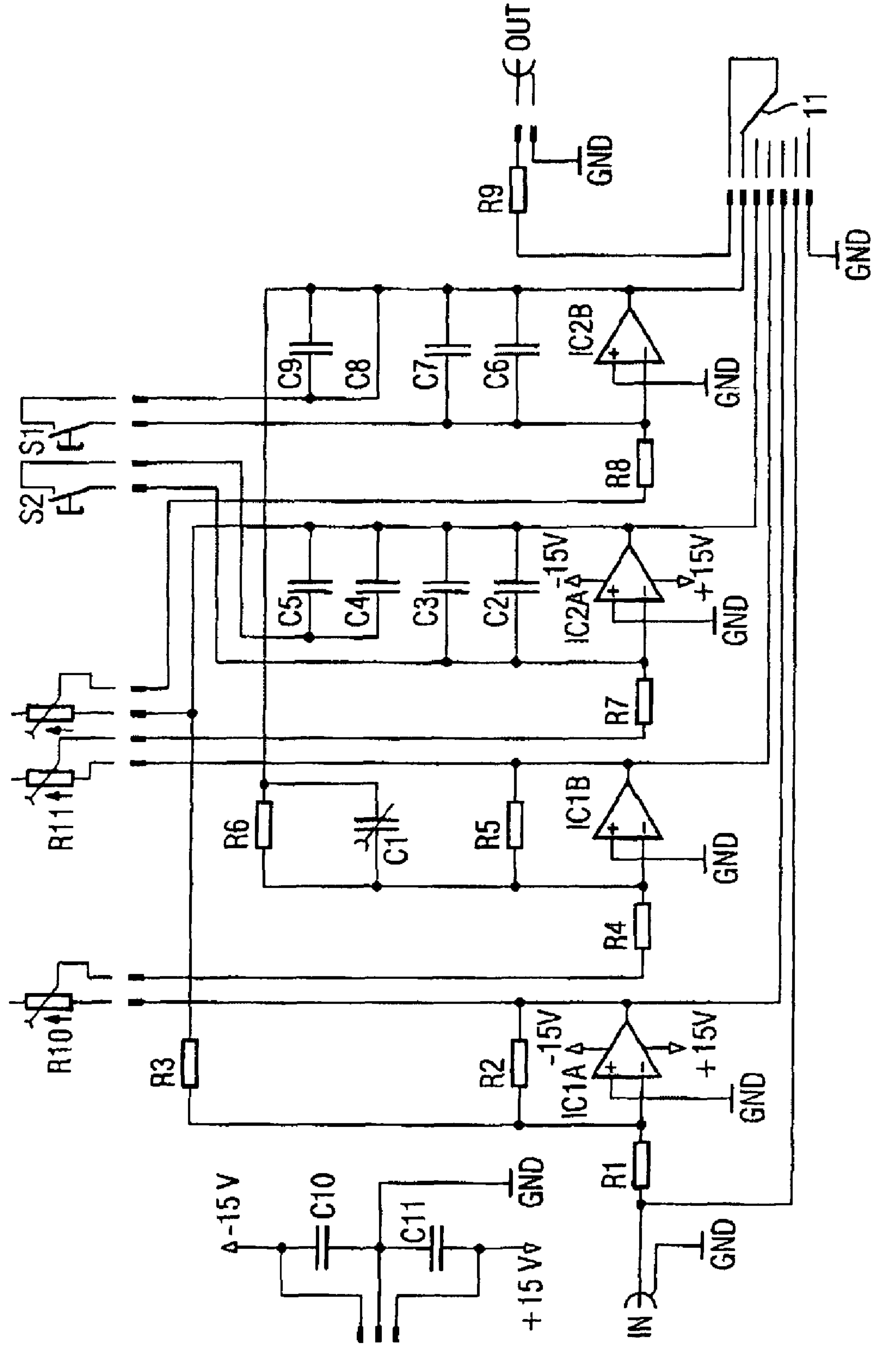
FIG 4 Prior art
FIG. 4 shows a circuit diagram of a universal filter known per se which can be used according to an embodiment.

FIG. 4 illustrates the circuit of a universal filter known per se. This circuit is capable of illustrating all relevant filter parameters, such as limit frequency, filter type (high-pass, low-pass, band-pass and band stop), and also the quality of filtration. The desired filter is activated by means of the corresponding switch position (rotary switch 11). If this switch 11 is replaced by an activation signal which stipulates both the type of filter and the activation time window, an optimal time-tuned filter can be applied to each disturbance variable.

Figure 5:
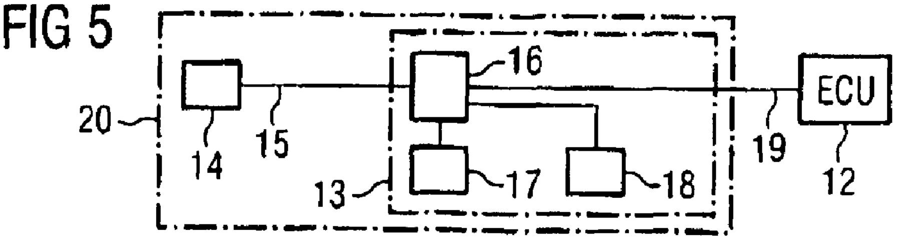
FIG. 5 shows an illustration in the form of a block diagram of a system according to an embodiment, designed to be separate from the engine control of the internal combustion engine, for cylinder pressure signal filtration.

The block illustration according to FIG. 5 is based on an engine control apparatus 12 (ECU) and an electronic evaluation unit 13, independent thereof, for carrying out the method according to various embodiments. Moreover, a cylinder pressure sensor 14 can be seen, which is assigned to a cylinder (not illustrated) of an internal combustion engine. The sensor 14 delivers an untreated cylinder pressure signal 2 to a control or computing unit 16 of the evaluation unit 13 via the line 15. The evaluation unit 13 comprises, furthermore, a universal filter 17, for example of the type illustrated in FIG. 4, and also a non-volatile memory 18. In the evaluation unit 13, the cylinder pressure signal 2 is filtered in the above-described way selectively in terms of the crankshaft, so that a corrected cylinder pressure signal can be transmitted to the engine control apparatus 12 via the data line 19. The cylinder pressure sensor 14 and the associated evaluation unit 13 may be spatially integrated into one unit 20. An essential advantage of the system or method according to various embodiments is that an autonomous and independent sensor and signal treatment unit 20 is obtained. The necessary information, such as the crankshaft position, engine rotational speed and camshaft phase position, are generated in the unit 20 itself. There is therefore no need for data exchange with the engine control 12. According to the current crankshaft position, an optimal filter can be selected for any disturbance variable and applied to it. This forms the basis for a disturbance-free effectively utilizable cylinder pressure signal.

What is claimed is:

1. A method for filtering a disturbed cylinder pressure signal from a cylinder in an internal combustion engine, wherein during one operating cycle of the engine, the disturbed cylinder pressure signal is affected by multiple disturbance variables occurring during specific time periods in the operating cycle, the multiple disturbance variables including multiple different types of disturbance variables, the method comprising the steps of:

maintaining assignments of different filter types to the different types of disturbance variables, each assignment comprising an assignment of one of the different filter types to one of the different types of disturbance variables, such that at least two different filter types are assigned to at least two different types of disturbance variables, for each disturbance variable in the pressure signal occurring during the operating cycle:

determining the type of the disturbance variable and applying the type of filter that is assigned to that type of disturbance variable in order to filter the disturbance variable from the pressure signal, such that different filter types are used to filter different disturbance variables during the operating cycle, and controlling the timing of applying the filters to the multiple disturbance variables in the cylinder pressure signal as a function of a crankshaft angle and predetermined time windows corresponding to the disturbance variables.

2. The method according to claim 1, comprising determining the filter type assigned to each disturbance variable and the corresponding disturbance variable time windows by tests on an engine test bench or on a test vehicle.

3. The method according to claim 1, comprising determining at least one filter parameter for each type of filter.

4. The method according to claim 3, wherein the at least one filter parameters include one or more of high-pass, low-pass, limit frequency and quality.

5. The method according to claim 3, wherein the cylinder pressure is detected by a cylinder pressure sensor belonging to the cylinder, and wherein the filter parameters are stored in a non-volatile manner in an electronic evaluation unit assigned to the cylinder pressure sensor.

6. The method according to claim 1, wherein the information on the current crankshaft position is dependent on rotational speed and is determined from a cylinder pressure profile analysis, significant points of the cylinder pressure profile being detected during an operating cycle of the internal combustion engine, and the engine rotational speed and current crankshaft position being determined from these points.

7. The method according to claim 6, wherein the engine rotational speed is determined from the time sequence of two combustion pressure maxima detected in the cylinder pressure profile.

8. The method according to claim 6, wherein, while the internal combustion engine is in operation, a camshaft phase adjustment takes place, by means of which the position of the disturbance variable windows is displaced in relation to the crankshaft position, and wherein filtration dependent on the crankshaft angle takes place, with the current camshaft phase adjustment being taken into account.

9. The method according to claim 8, wherein the camshaft phase adjustment is determined from at least one of the pressure drop during the opening of the outlet valves and the pressure rise during the closing of the inlet valves.

10. The method according to claim 1, wherein filter type comprising a low-pass filter with a limit frequency of about 5 kHz is assigned to a disturbance variable which is caused by the closing of gas exchange valves of the internal combustion engine.

11. The method according to claim 1, wherein filter type comprising a low-pass filter with a limit frequency of about 5 kHz is assigned to a disturbance variable which is caused by the closing of the gas exchange valves of the cylinder which is specific in terms of the cylinder pressure.

12. A system for filtering a disturbed cylinder pressure signal from a cylinder in an internal combustion engine, wherein during one operating cycle of the engine, the disturbed cylinder pressure signal is affected by multiple disturbance variables occurring during specific time periods in the operating cycle, the multiple disturbance variables including multiple different types of disturbance variables, the system comprising:

non-volatile memory storing assignments of different filter types to the different types of disturbance variables, each assignment comprising an assignment of one of the different filter types to one of the different types of disturbance variables, such that at least two different filter types are assigned to at least two different types of disturbance variables, an electronic evaluation unit embodied in non-transitory computer-readable media, which electronic evaluation unit is operable, for each disturbance variable of the cylinder pressure signal, which disturbance variable occurs during specific limited time spans of the pressure profile of an operating cycle, to determine the type of the disturbance variable and applying the type of filter that is assigned to that type of disturbance variable in order to filter the disturbance variable from the pressure signal, such that different filter types are used to filter different disturbance variables during wherein the non-volatile memory further stores disturbance variable time windows associated with the multiple disturbance variables in the operating cycle , and wherein the electronic evaluation unit is further operable to control the timing of applying the filters to the disturbance variables based on a current crankshaft position and the stored disturbance variable windows associated with the multiple disturbance variables.

13. The system according to claim 12, in which the evaluation unit is an autonomously operating apparatus independent of the engine control.

14. The system according to claim 13, in which the evaluation unit and a cylinder pressure sensor for detecting the untreated cylinder pressure signal form a spatially integrated component.

15. The system according to claim 12 in which the alternating activation, dependent on the crankshaft angle, of the respective disturbance variable-selective filters is implemented with the aid of a universal filter circuit.

16. A system for filtering a disturbed cylinder pressure signal from a cylinder in an internal combustion engine, wherein during one operating cycle of the engine, the disturbed cylinder pressure signal is affected by multiple disturbance variables occurring during specific time periods in the operating cycle, the multiple disturbance variables including multiple different types of disturbance variables, comprising:

means for storing assignments of different filter types to the different types of disturbance variables, each assignment comprising an assignment of one of the different filter types to one of the different types of disturbance variables, such that at least two different filter types are assigned to at least two different types of disturbance variables, for each disturbance variable in the pressure signal occurring during the operating cycle:

means for determining the type of the disturbance variable and applying the type of filter that is assigned to that type of disturbance variable in order to filter the disturbance variable from the pressure signal, such that different filter types are used to filter different disturbance variables during the operating cycle.

means for controlling the timing of applying the filters to the multiple disturbance variables in the cylinder pressure signal as a function of a crankshaft angle and predetermined time windows corresponding to the disturbance variables.

17. The system according to claim 16, comprising means for determining the filter type assigned to each disturbance variable and the corresponding disturbance variable time windows by tests on an engine test bench or on a test vehicle.

18. The system according to claim 16, wherein at least filter parameter for each type of filter is selected form the group consisting of high-pass, low-pass, limit frequency and quality is determined and is fixed.

19. The system according to claim 18, comprising a cylinder pressure sensor belonging to the cylinder detecting the cylinder pressure wherein the filter parameters are stored in a non-volatile manner in an electronic evaluation unit assigned to the cylinder pressure sensor.

* * * * *